US008306924B2

(12) United States Patent
Ostanik

(10) Patent No.: US 8,306,924 B2
(45) Date of Patent: Nov. 6, 2012

(54) METHOD AND SYSTEM FOR ONLINE SUBMITTAL EXCHANGE

(75) Inventor: Matthew T. Ostanik, Dallas Center, IA (US)

(73) Assignee: Submittal Exchange, LLC, West Des Moines, IA (US)

( * ) Notice: Subject to any disclaimer, the term of this patent is extended or adjusted under 35 U.S.C. 154(b) by 1317 days.

(21) Appl. No.: 11/560,708

(22) Filed: Nov. 16, 2006

(65) Prior Publication Data

US 2007/0112860 A1    May 17, 2007

Related U.S. Application Data

(60) Provisional application No. 60/737,338, filed on Nov. 16, 2005.

(51) Int. Cl.
 *G06Q 10/00* (2012.01)
(52) U.S. Cl. ................ 705/342; 705/7.11
(58) Field of Classification Search .......... 705/342, 705/7.11
 See application file for complete search history.

(56) References Cited

U.S. PATENT DOCUMENTS

| | | | |
|---|---|---|---|
| 5,548,506 A * | 8/1996 | Srinivasan .................. 705/7.15 |
| 5,761,674 A * | 6/1998 | Ito ............................. 1/1 |
| 6,038,547 A | 3/2000 | Casto | |
| 6,092,050 A | 7/2000 | Lungren et al. | |
| 6,393,410 B1 | 5/2002 | Thompson | |
| 6,418,457 B1 * | 7/2002 | Schmidt et al. ............. 715/255 |
| 6,434,607 B1 * | 8/2002 | Haverstock et al. ......... 709/217 |
| 6,446,053 B1 | 9/2002 | Elliott | |
| 6,678,698 B2 * | 1/2004 | Fredell et al. ............... 707/608 |
| 6,687,559 B2 | 2/2004 | Radjy et al. | |
| 6,766,334 B1 * | 7/2004 | Kaler et al. ................. 1/1 |
| 6,952,717 B1 * | 10/2005 | Monchilovich et al. ...... 709/205 |
| 7,051,036 B2 * | 5/2006 | Rosnow et al. ............. 707/723 |
| 7,062,514 B2 * | 6/2006 | Harris ........................ 1/1 |
| 7,302,436 B2 * | 11/2007 | Qubti et al. ................. 1/1 |
| 7,330,822 B1 * | 2/2008 | Robson et al. ............... 705/7.15 |
| 7,406,432 B1 * | 7/2008 | Motoyama .................. 705/7.16 |
| 7,644,008 B1 * | 1/2010 | Issa et al. .................... 705/7.11 |
| 2002/0073114 A1 * | 6/2002 | Nicastro et al. ............. 707/500 |
| 2002/0178036 A1 * | 11/2002 | Murata et al. .............. 705/7 |
| 2003/0018507 A1 * | 1/2003 | Flanagan .................... 705/8 |
| 2003/0023677 A1 * | 1/2003 | Morison Zuill et al. ...... 709/203 |

(Continued)

OTHER PUBLICATIONS

"Business Process Guideline for Project Documentation". Oct. 2002. Amgen Engineering Operations Services. Version 1.*

(Continued)

*Primary Examiner* — Peter Choi
(74) *Attorney, Agent, or Firm* — McKee, Voorhees & Sease, P.L.C.

(57) ABSTRACT

A method and system is provided for facilitating exchange and review of electronically submitted construction submittals. The method and system also provide for management and review of construction submittals associated with a construction project. The method and system provides convenience and reduces expenses for architects, contractors and consultants involved in a construction process. The method includes providing an application adapted to provide a first level of access to a contractor to submit construction submittals, a second level of access to an architect to review and manage construction submittals, a third level of access to consultants to review construction submittals, and a fourth level of access to facilities owners, construction managers, and other parties to monitor the submittal process. The application is adapted to display the status, review dates, actions, and other relevant information of all project submittals, whether electronic, paper, or physical samples, in a linear log format.

29 Claims, 15 Drawing Sheets

U.S. PATENT DOCUMENTS

| | | | |
|---|---|---|---|
| 2003/0135401 | A1 | 7/2003 | Parr |
| 2004/0122849 | A1* | 6/2004 | Nelson ................ 707/102 |
| 2004/0215633 | A1 | 10/2004 | Harris |
| 2005/0021449 | A1* | 1/2005 | Sweeney ................ 705/37 |
| 2005/0044010 | A1 | 2/2005 | Jannott et al. |
| 2005/0108232 | A1 | 5/2005 | Rockey |
| 2005/0188299 | A1 | 8/2005 | Furman et al. |
| 2005/0226261 | A1* | 10/2005 | Varadarajan et al. ......... 370/412 |
| 2006/0155634 | A1 | 7/2006 | Woodard |

OTHER PUBLICATIONS

Kang, Leen-Seok; Paulson, Boyd C.; Kwak, Joong-Min; Kim, Chang-Hak; "Business Breakdown Structure for Construction Management and Web-Based Application System". Aug. 2005. ITcon. vol. 10. pp. 169-191.*

"Autodesk Buzzsaw". 2002-2003. retrieved from archived versions of <http://www.autodesk.com/buzzsaw>.*

"Document Control Management Policies & Procedures". Jan. 1, 2004. Los Angeles Community College District Program Management Plan. vol. 1, Section 1.*

"Primavera Expedition 7: Master Multiple Projects With One Project Control Solution". 2000. Primavera Systems Inc.*

Boda, John A.; "Caltrans Guide to Resource Breakdown Structure (RBS)". Aug. 1998. Release 3.1.*

"Work Breakdown Structure Reference Guide". May 1994. National Aeronautics and Space Administration.*

Yialelis, Nicholas; Sloman, Morris. "A Security Framework Supporting Domain Based Access Control in Distributed Systems". 1996. IEEE.*

Sampson, Richard; "Project Management Online". Jun. 2003. Modern Steel Construction.*

"Reviewer's Guide—Details Project Information Management". Version 3. AEC Software, Inc. archived Oct. 14, 2002.*

"SureTrak Project Manager—User Manual". 1999. Primavera Systems Inc.*

"Bechtel, Webvan Use Cephren'S Online Collaboration Service, Projectnet, to Streamline Construction of Distruibition Centers", Busines Wire, Apr. 7, 2000, 3 pages.

BRICS/NET, BRICSNET Project/Center, http://web.archive.org/web/20020202202851/corporate.bricksnet.com, printed Jun. 8, 2009, 3 pages.

BRICS/NET, "The Difference Between a Building and an Intellectual Property", 5 pages.

"About Cephren Projectnet", http://web.archive.org/web/20000621170116/www.cephren.com, printed Jun. 8, 2009, 2 pages.

Citadon Products—Overview, http://web.archive.org/web/20020407142831/www.citadon.com/product . . . , printed Jun. 8, 2009, 5 pages.

Jurewicz, John, "AECVision: Opinion" The On-Line Magazine for Building Design Technology . . . Brought to You by AECCafe.com, http://www.aeccafe.com/AECVision/opionoin/extranet.php, printed May 28, 2009, 3 pages.

"Meridian Project Systems' PROJECTTALK.COM Goes Live!" http://aecnewsroom.com/html/2000/June/newsroom/shows/AECsystems2000/mpspr . . . , printed May 28, 2009, 2 pages.

ProjectTalk, "How can ProjectTalk help you?" http://www.project-talk.com/MK/About/fields.shtml#architect, printed Jun. 8, 2009, 3 pages.

RMS Support Center, Project Management Plan Resident Management System (RMS) and Quality Control System (QCS), May 2002, 8 pages.

* cited by examiner

Current Industry Process

PROJECT INDEX

| Project # | Project Name | Status |
|---|---|---|
| 903C | Cody Elementary School Addition and Renovation | No Activity |
| 101 | FRK Test Project | 1 Submittal Pending Review |
| 84848 | [Test] JMS Addition | 8 Submittals Pending Review |

Add new project

*FIG. 10*

| ACTIVITY SUMMARY | FULL LOG | EDIT SECTIONS | PROJECT TEAM | PREFERENCES |

PROJECT: Cody Elementary School Addition and Renovation | Project No. 903C

| Section Number | Section Title | Add | Most Recent Activity | Date | Type | Action |
|---|---|---|---|---|---|---|
| 02211 | Rough Grading | ADD | | | | |
| 02223 | Backfilling | ADD | | | | |
| 02270 | Slope Protection and Erosion Control | ADD | | | | |
| 02281 | Termite Control | ADD | | | | |
| 02510 | Asphaltic Concrete Paving | ADD | | | | |
| 02520 | Portland Cement Concrete Paving | ADD | | | | |
| 02609 | Pipe Culverts | ADD | 1st submittal of Product Data reviewed by Architect | 8/29/05 | | MCN |
| 02763 | Painted Pavement Markings | ADD | | | | |
| 03100 | Concrete Formwork | ADD | | | | |
| 03200 | Concrete Reinforcement | ADD | 1st submittal of Shop Drawings reviewed by Architect | 9/7/05 | 5 copies | MCN |
| 03300 | Cast-In-Place Concrete | ADD | 1st submittal of Product Data - Concrete Mix Design reviewed by Architect | 9/7/05 | 4 copies | RAA |
| 03346 | Concrete Floor Finishing | ADD | | | | |
| 03505 | Self-Leveling Underlayment | ADD | | | | |
| 04100 | Mortar | ADD | | | | |
| 04300 | Unit Masonry Systems | ADD | | | | |
| 04451 | Cut Stone Veneer | ADD | | | | |
| 05120 | Structural Steel | ADD | | | | |
| 05210 | Steel Joists | ADD | | | | |

| ACTIVITY SUMMARY | FULL LOG | EDIT SECTIONS | PROJECT TEAM | PREFERENCES |

PROJECT: Cody Elementary School Addition and Renovation | Project No. 903C

[Add new] [Delete selected]

- ☐ 02211 Rough Grading — Edit Delete
- ☐ 02223 Backfilling — Edit Delete
- ☐ 02270 Slope Protection and Erosion Control — Edit Delete
- ☐ 02281 Termite Control — Edit Delete
- ☐ 02510 Asphaltic Concrete Paving — Edit Delete
- ☐ 02520 Portland Cement Concrete Paving — Edit Delete
- ☐ 02609 Pipe Culverts — Edit Delete
- ☐ 02763 Painted Pavement Markings — Edit Delete
- ☐ 03100 Concrete Formwork — Edit Delete
- ☐ 03200 Concrete Reinforcement — Edit Delete
- ☐ 03300 Cast-In-Place Concrete — Edit Delete
- ☐ 03346 Concrete Floor Finishing — Edit Delete
- ☐ 03505 Self-Leveling Underlayment — Edit Delete
- ☐ 04100 Mortar — Edit Delete

[Add new] [Delete selected]

*FIG. 13*

| ACTIVITY SUMMARY | FULL LOG | EDIT SECTIONS | PROJECT TEAM | PREFERENCES |

PROJECT: Cody Elementary School Addition and Renovation | Project No. 903C

Please enter all project team members.

[Add new team member]

- Frevert-Ramsey-Kobes Architects-Engineers Architect/Engineer

| | | | |
|---|---|---|---|
| Egger, Jim | Read Only 00000-16999 | Edit | Delete |
| Ostanik, Matt | Review 00000-11600 | Edit | Delete |
| Saxton, Dale | Read Only 00000-16999 | Edit | Delete |
| Zbylicki, Steve | Read Only 00000-16999 | Edit | Delete |

- Frye Builders Contractor

| | | | |
|---|---|---|---|
| Kraft, Wayne | Submit 00000-16999 | Edit | Delete |

- KJWW Engineering Consultants Consultant

| | | | |
|---|---|---|---|
| steigerkr@kjww.com | Review 15080-16721 | Edit | Delete |

*FIG. 14*

| ACTIVITY SUMMARY | FULL LOG | EDIT SECTIONS | PROJECT TEAM | PREFERENCES |

PROJECT: Kirkwood Benton Hall Library Renovation | Project No. 05226

Project Information                                        [ Save changes ]

Project Name:             [ Kirkwood Benton Hall Library Renovation ]

Architect's Project Number:   [ 05226 ]

General Settings

○ On  ● Off    Architect/Engineer approval also required for <u>all</u> consultant reviewed submittals
               (Explain This)

● On  ○ Off    Assign unique submittal numbers for all submittals on the project
               (Explain This)

● On  ○ Off    Send reviewers email reminders of outstanding items every [ 5 ▼ ] days
               (Explain This)

● On  ○ Off    Enable contractor to log when submittals are received from and returned to
               subcontractors
               (Explain This)

Email Notifications

Email notifications of new electronic submittals are automatically sent to individuals as identified on the *Project Team* tab. If you would like to monitor when notices are sent to contractors and consultants, use the options below:

● On  ○ Off    Send email notifications each time a new submittal is uploaded or reviewed ● On  ○ Off    Send a copy of all contractor/consultant emails to
               the Project Architect/Engineer: [ bfritz@opnarchitects.com ]

○ On  ● Off    Send a copy of all contractor/consultant emails to
               another individual: [            ]

Transmittals

The system can automatically create transmittals and routing slips for use when logging paper submittals. If you'd like for transmittals to note a carbon copy to (for example, cc: to an owner) enter that here:

Transmittal Carbon Copy To:   [                    ]

*FIG. 15*

METHOD AND SYSTEM FOR ONLINE SUBMITTAL EXCHANGE

CROSS-REFERENCE TO RELATED APPLICATION

This application claims priority to U.S. Provisional Patent Application No. 60/737,338 filed Nov. 16, 2005, herein incorporated by reference in its entirety.

BACKGROUND OF THE INVENTION

The present invention relates to documentation in the construction industry. The design and construction industry is one of the largest sectors of our nation's economy, generating nearly 5 percent of the U.S. Gross Domestic Product. One million major construction projects take place per year. As part of the design of any major building project, thousands of documents are generated and exchanged between architects, engineers, contractors, and clients.

During the construction phase of most building projects, contractors will typically provide submittals, or "shop drawings," to the architects and engineers to document the exact materials and assemblies that will be used in the building. The architect reviews the shop drawings, shares them with consultants, and indicates whether they meet the requirements of the project specifications. Shop drawing review is a critical check-and-balance during construction to ensure that the end result meets the quality levels desired by the client and called for in the architect's design.

While shop drawing review is an integral part of the construction process, the methodology used to perform it is cumbersome and inefficient. Thousands of paper documents and hardcopies are produced, resulting in a significant cost of materials, shipping and time. A typical mid-size (20-employee) architecture firm might spend $35,000 or more a year on shipping and administrative tasks related to processing over 400,000 pieces of paper received as part of submittal review for their design projects.

An additional complication is that there are numerous rules and conventions that have been developed by the design and construction industry over the course of time to regulate the flow of paper submittals and shop drawings, ensure the architect's ability to control the review process, and address legal liability for reviews and other special considerations. An example of such a rule or consideration is the need to apply one of several possible different systems of submittal numbering to all submittals provided by a contractor, or variations thereof. Another example is the need of the architect and their consultants to use customized review or action codes and terminology that has been developed in conjunction with their legal counsel. Yet another example is the need of the architect to be able to control when consultant-reviewed submittals are returned to the contractor and to be able to prevent the contractor from viewing the items until the architect has verified that review is complete. A still further example is the need of the architect to maintain control over a centralized, detailed tracking log that records status, review dates, version histories, and actions for all project submittals regardless whether they are electronic submittals, paper items, physical samples, or any other format. Various approaches have been attempted to improve the submittal review process, but all approaches to date have failed to address these and other fundamental rules and controls that are required to make the process functional for architects.

Approaches that have been attempted include, for example, U.S. Patent Application, Publication No. US 2005/0188299 A1 ("System and method for generating construction document submittal packages") to Furman et al., which is directed towards a system and method for generating construction submittal document packages. Furman et al., however, takes a different view of the process, by focusing on selecting pre-established documents to include within a submittal package. It does not provide any type of central hub for contractors, architects, and consultants to be involved in transfer, review, or tracking of construction submittals.

U.S. Patent Application, Publication No. US 2005/0108232 A1 ("Electronic submittal method and system") to Rockey proposes an online system for the exchange of electronic construction submittals. Such a system does not provide an architect with primary control and does not address the rules for submittal management that are required by architects. This system does not offer any features for tracking or management of paper submittals or physical samples that are not sent electronically. The system does not provide a central submittal log from which to manage information for all project submittals, regardless of format. In addition, the system is very narrow in its interpretation of how the submittal process functions—for example, providing only four predefined actions that can be taken by a reviewer on a submittal, instead of allowing the Architect or Consultant to define their own review actions.

U.S. Patent Application, Publication No. US 2005/0044010 A1 ("System and method of producing construction specifications") to Jannott, et al., proposes a system for creating construction project specifications based on selections from users. It does not address the exchange or review of construction submittals.

U.S. Patent Application, Publication No. US 2004/0215633 A1 ("Construction project submittal management") to Harris is directed towards a network based construction project management system. The Harris publication describes a system for submittal review that is primarily controlled by the Contractor, not the Architect, and does not address the rules for submittal management that are required by architects. In addition, the proposed system included significant components (online generation of actual submittal packets, financial management and release of payments from the Contractor to suppliers/subcontractors) that are not relevant to this invention.

U.S. Pat. No. 6,687,559 ("Apparatus and method for a vertically integrated construction business") to Radjy, et al., discusses a process for creating construction specifications for concrete recipes. The process does not address general submittal exchange and review.

U.S. Pat. No. 6,038,547 ("Construction tracking and payment method and system") to Casto describes construction management software that tracks job completion and payments to subcontractors. The software does not specifically track or manage the submittal review process.

U.S. Pat. No. 6,092,050 ("Graphical computer system and method for financial estimating and project management") to Lundgren, et al., describes a system for preparing construction bids and managing projects. The system does not specifically address tracking or management of the submittal review process.

U.S. Pat. No. 6,446,053 ("Computer-implemented method and system for producing a proposal for a construction project") to Elliot proposes a system for developing and submitting construction bids. The software does not specifically track or manage the submittal review process.

U.S. Pat. No. 6,393,410 ("Process and a system for listing information relating to a construction project over a computer network") to Thompson discusses a construction management system that allows for project specifications and submittals to be stored online for the purpose of being purchased by other parties or submitting proposals on projects. The system does not specifically address tracking or management of the submittal review process.

Thus, although there have been attempts to address various aspects of the problems regarding documentation in the construction industry, problems remain and all attempts to date have failed to adequately address the rules and considerations that are required by architects to manage the traditional paper-based construction submittal process. What is needed is a method and system for facilitating the exchange and review of construction submittals that adequately addresses these rules and considerations.

BRIEF SUMMARY OF THE INVENTION

Therefore, it is a primary object, feature, or advantage of the present invention to improve upon the state of the art.

It is a further object, feature, or advantage of the present invention to facilitate the exchange, review, and control of construction submittals between contractors, architects, engineers, consultants, and other members of the project team.

Another object, feature, or advantage of the present invention is to provide a method and system for management of all submittals on a construction project.

Yet another object, feature, or advantage of the present invention is to provide a method and system that tracks the status of paper items, electronic items, and physical samples.

A still further object, feature, or advantage of the present invention is to provide information and direct access to submittals back to contractors, engineers, and architects involved with a project.

Another object, feature, or advantage of the present invention is to record dates, quantities, links to electronic files, actions, and pertinent remarks from reviewers in a structured log format with the status of each item recorded in a linear, step-by-step manner.

Another object, feature, or advantage of the present invention is to organize the submittal log by numbering according to project specification section.

Yet another object, feature, or advantage of the present invention is to further organize the submittal log by multiple, user-controlled options for individual submittal numbering, including unique numbering over the entire project, numbering within each specification section, or variations thereof as required by the architect or contractor.

A still further object, feature, or advantage of the present invention is the ability to record in the submittal log the submittal requirements and expected items for the project in advance of items being submitted, in order to provide a comprehensive list of required submittals and documents.

Another object, feature, or advantage of the present invention is give the user the ability to record new submittals, transfer submittals to other parties, or record review results through a single multi-functional button per each specification section in the log.

Yet another object, feature, or advantage of the present invention is to automatically send electronic mail notices of new or reviewed submittals to the appropriate team members as dictated by the specification section range entered for each team member on the project team dialogue.

A still further object, feature, or advantage of the present invention is to include in the electronic mail notices a direct hypertext link to the relevant specification section, submittal item, and electronic file link as listed in the submittal log.

Another object, feature, or advantage of the present invention is to allow the architect control over the review process and the ability to prevent the contractor from receiving or viewing results of consultant reviews until the architect has also reviewed or released the item.

Another object, feature, or advantage of the present invention is to allow the architect or consultants to setup their own review or action codes, options or terminology based on their firm's standards or the advice of their legal counsel.

Yet another object, feature, or advantage of the present invention is to provide the user the ability to switch views between different documents types, including but not limited to, submittals and closeout documents, or to display all document types simultaneously in a single comprehensive log.

A still further object, feature, or advantage of the present invention is provide the user the ability to filter and sort the submittal log based on review results, items pending review, submittals still needed, or other criteria.

Another object, feature, or advantage of the present invention is to recognize the company affiliation of new users based on the domain portion of their email address and to assign project access privileges as appropriate based on their employer or company.

Another object, feature, or advantage of the present invention is to send automatic electronic mail reminders of outstanding items waiting for submittal or review as intervals specified by the user.

Another object, feature, or advantage of the present invention is show a graphic status bar indicating the percentage of expected project submittals or other documents that have been exchanged through the system to date.

Yet another object, feature, or advantage of the present invention is to generate paper transmittals and review slips when required by the user for exchange of paper items or physical samples.

A still further object, feature, or advantage of the present invention is to allow all parties to have access to the system but allows primary control to be given to the architect, as it is the architect who ultimately sets the requirements and procedures for submittals on any given project.

One or more of these and/or other objects, features or advantages of the present invention will become apparent from the specification and claims that follow.

According to one aspect of the present invention a system for facilitating exchange and review of electronically submitted construction submittals and management and review of all construction submittals associated with a construction project is provided. The system includes a computing device and an application accessible using the computing device. The application is adapted to provide a first level of access to a contractor to submit construction submittals, a second level of access to an architect to review and manage construction submittals, a third level of access to at least one consultant to review construction submittals, and a fourth level of access for monitoring the submittal process. The application is further adapted to display the status, review dates, actions, and other relevant information of all project submittals, whether electronic, paper, or physical samples, in a submittal log organized in a linear log format and further organized by project specification section and a submittal numbering system selected by the architect.

According to another aspect of the present invention a method for facilitating exchange and review of electronically submitted construction submittals and management and review of all construction submittals associated with a construction project is provided. The method includes providing access to a computing device and providing an application accessible using the computing device. The application is adapted to provide a first level of access to a contractor to submit construction submittals, a second level of access to an architect to review and manage construction submittals, a third level of access to at least one consultant to review construction submittals, and a fourth level of access to for monitoring the submittal process. The fourth level of access may be provided to facilities owners, construction managers, or other parties with a need to monitor the submittal process.

BRIEF DESCRIPTION OF THE DRAWINGS

FIG. 10 is a screen display showing a project index according to one embodiment of the present invention.

FIG. 11 is a screen display illustrating an activity summary according to one embodiment of the present invention.

FIG. 12 is a screen display illustrating a full log according to one embodiment of the present invention.

FIG. 13 is a screen display illustrating an edit sections feature according to one embodiment of the present invention.

FIG. 14 is a screen display illustrating a project team feature according to one embodiment of the present invention.

FIG. 15 is a screen display illustrating a preferences feature according to one embodiment of the present invention.

DETAILED DESCRIPTION OF THE PREFERRED EMBODIMENT

The invention is an online computer program that facilitates the exchange and review of construction submittals electronically, along with providing a comprehensive system for the management of all submittals (both electronic and paper) on a construction project. Users of the invention access it through an online network, such as the Internet. One embodiment of the present invention is described herein. The present invention is not to be limited to this specific embodiment as the present invention contemplates numerous variations and alternative embodiments.

Figure 1A:
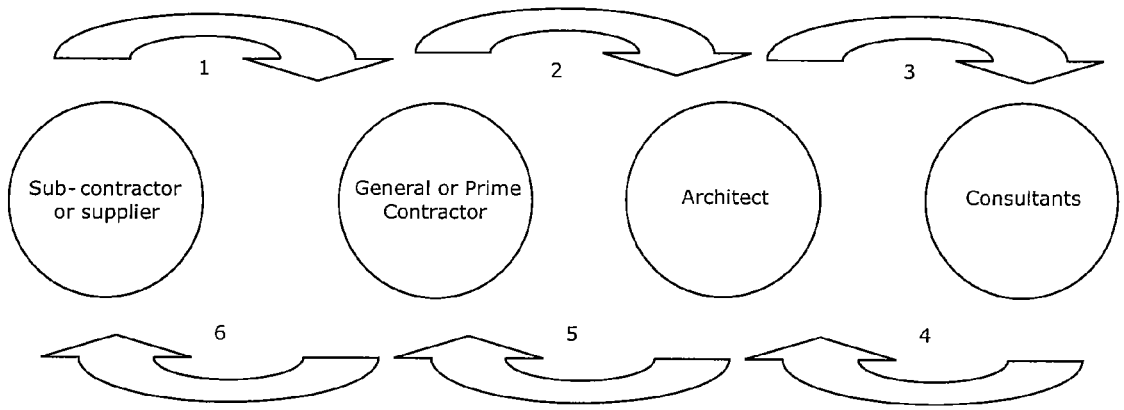
FIG. 1A illustrates a general overview of the submittal review process as it exists.

FIG. 1A shows a general overview of how the submittal review process currently works in the design and construction industry. In step 1, a sub-contractor or supplier sends paper copies of submittals to a general contractor. In step 2, the general contractor sends submittals to an architect. In step 3, the architect sends submittals to the consultant. In step 4, the consultant sends submittals to the architect. In step 5, the architect sends submittals to the general or prime contractor. In step 6, the general or prime contractor sends submittals to the sub-contractor or supplier. The process is time consuming.

Figure 1B:
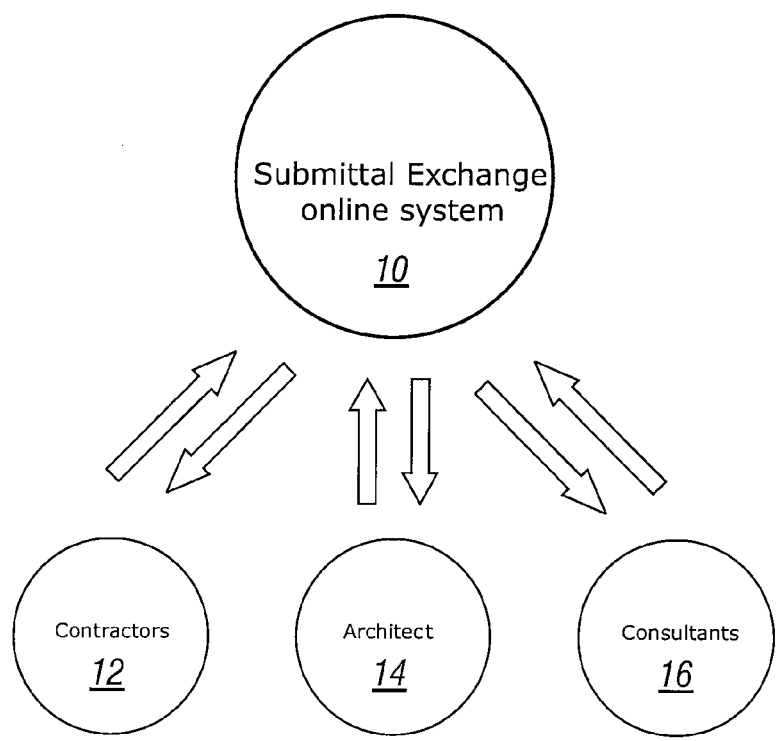
FIG. 1B illustrates the submittal review process of one embodiment of the present invention.
Figure 2:
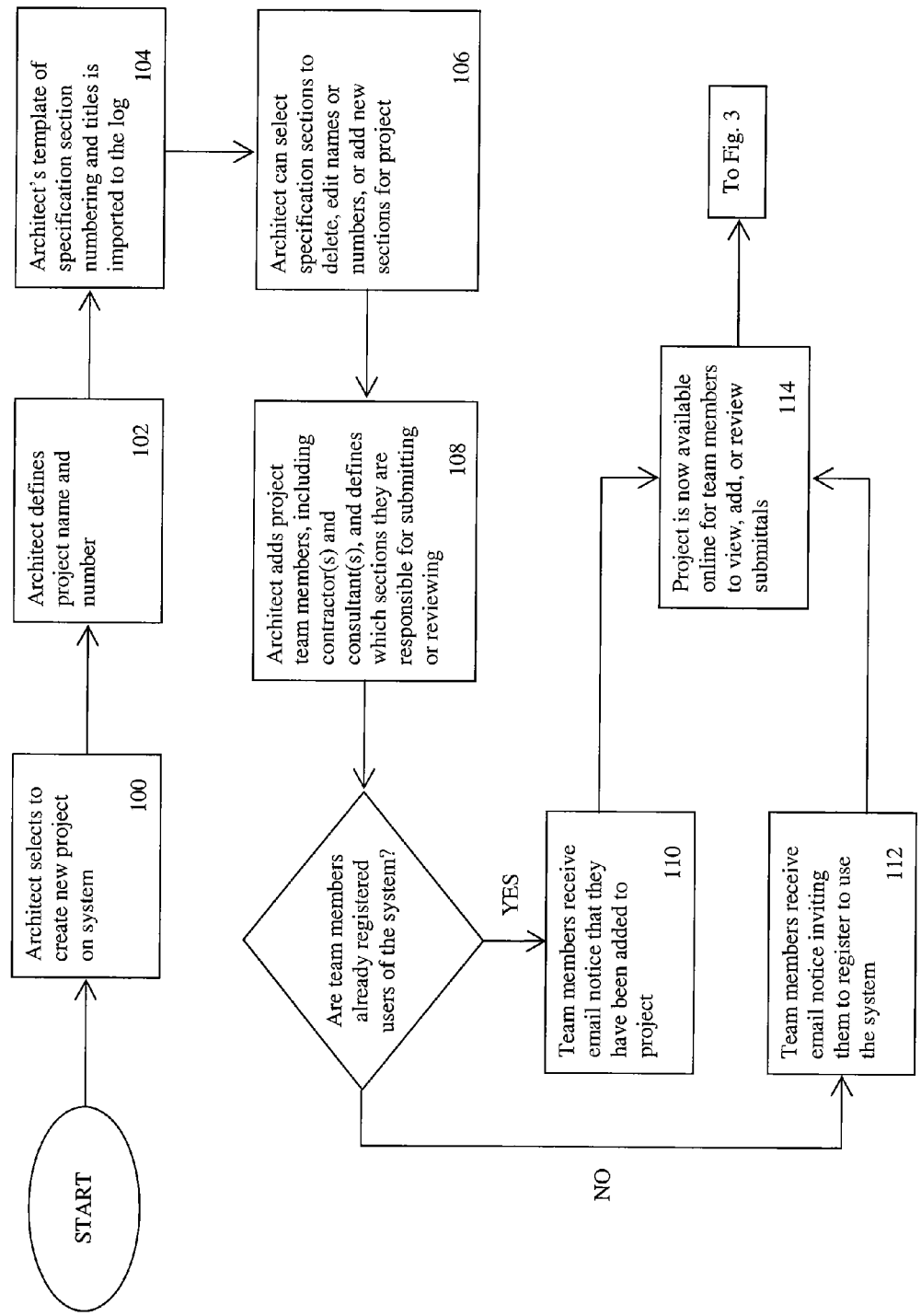
FIGS. 2-7 provide a process flow diagram according to one embodiment of the present invention.
Figure 3:
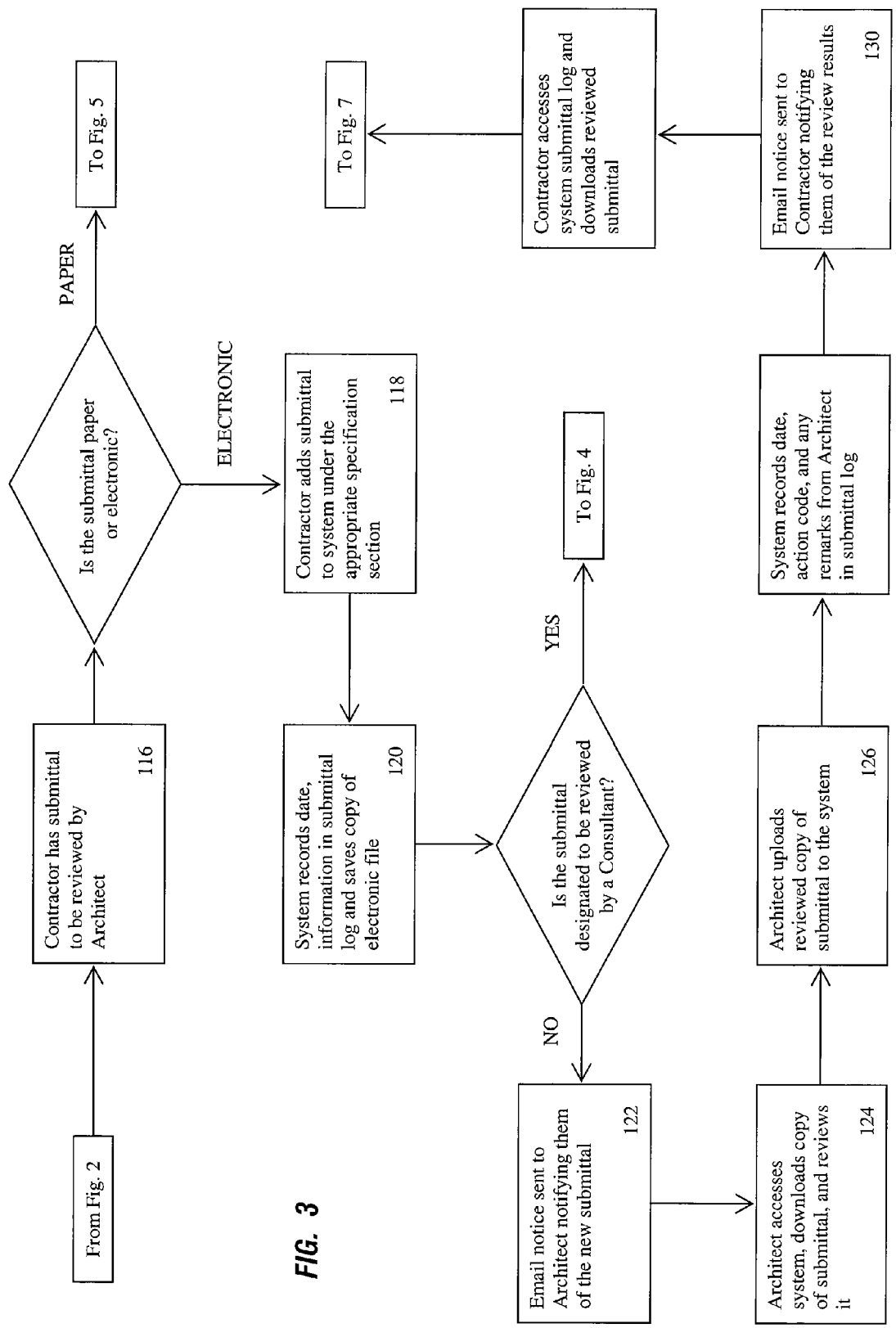
Figure 4:
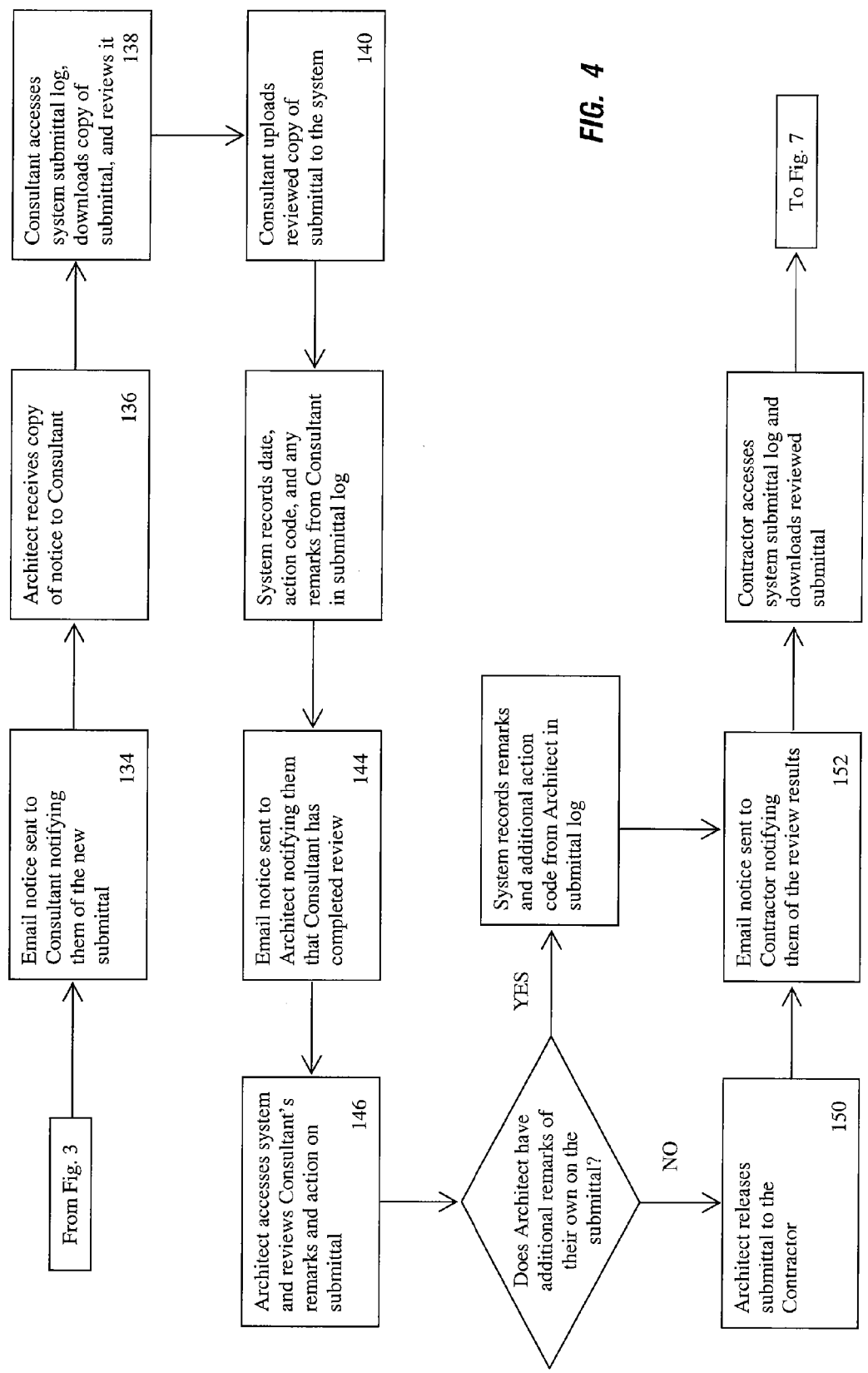
Figure 5:
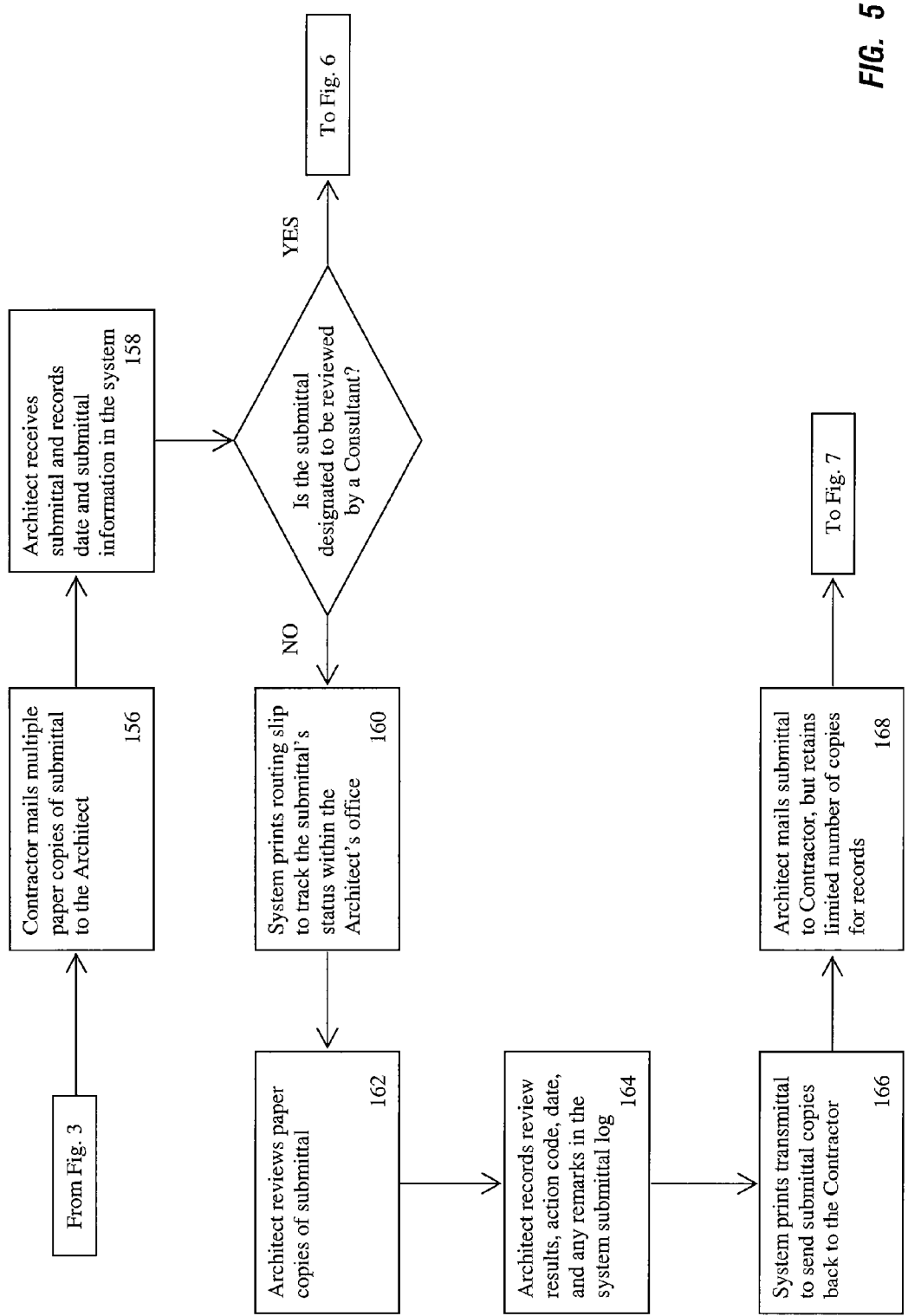
Figure 6:
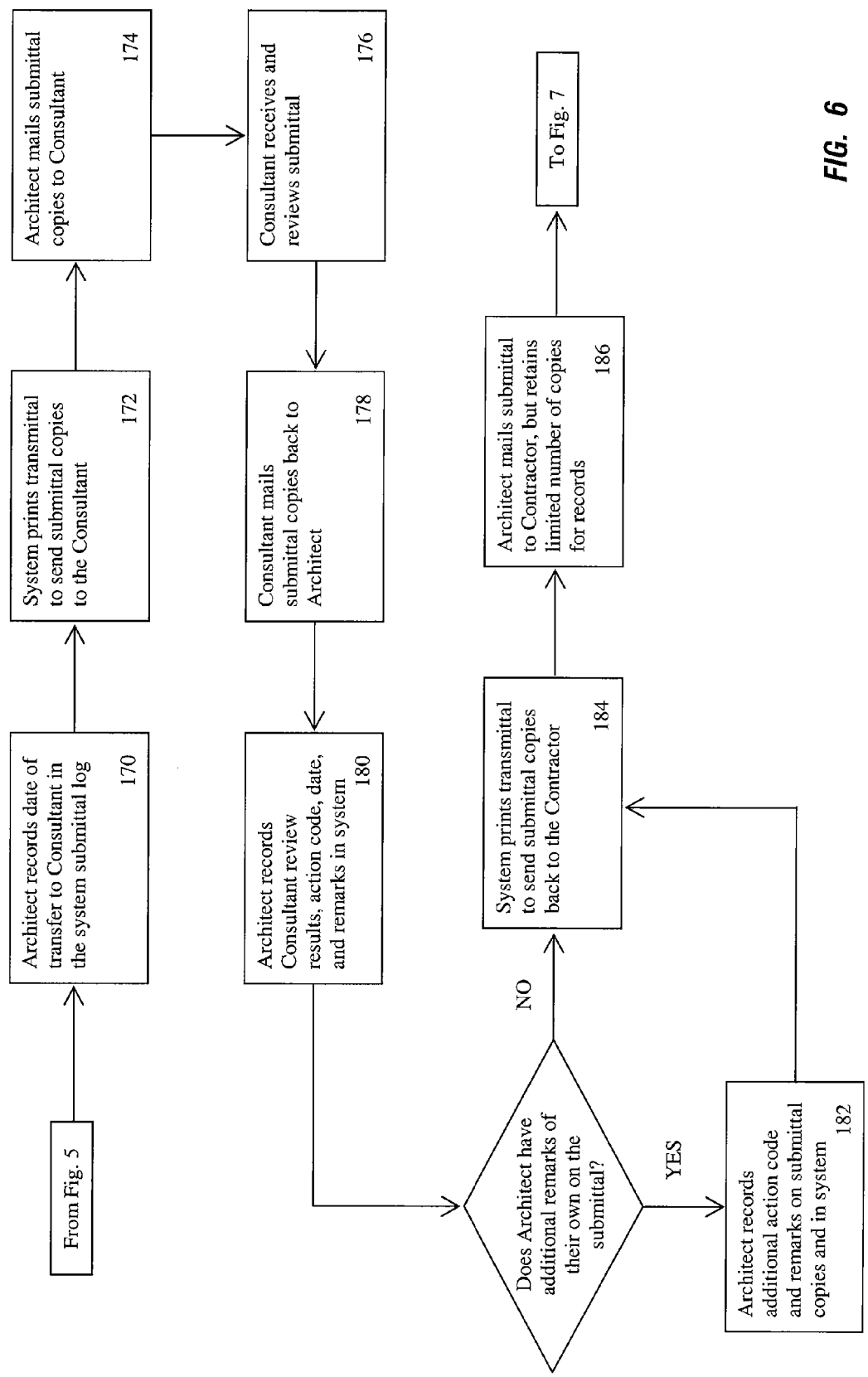

FIG. 1B illustrates one embodiment of the present invention. As shown in FIG. 1B, the present invention provides for a central hub for management and tracking of all construction project submittals. Note that with the central hub design, contractors 12, an architect 14, and consultants 16 can all access a submittal exchange online system 10. This allows for transfer, review, and tracking of construction submittals, thereby providing an opportunity for saving paper, time, and money. Thus, it should be appreciated that the central hub design provides a methodology which reduces the time associated with information flow between contractors 12, an architect 14, and consultants 16. The present invention also provides for managing the information flow process in a manner which is convenient and understandable to all of those involved in the process, while still providing for full and complete documentation and proper decision-making throughout the process.

FIG. 2 through FIG. 7 illustrates one embodiment of a process flow diagram for typical use of the invention. The process begins when an Architect selects to create a new project on the system in step 100. The project has a project specification associated with it. The project specification will have various sections which are generally numbered for ease of reference. The system prompts the Architect to define the project name and number in step 102. The Architect's standard template of specification section numbering and titles, which has been pre-defined by the Architect, is imported in step 104. The Architect can select specification sections to delete, edit names or numbers, or add new sections as appropriate for the project in step 106. The Architect may load in the submittal requirements for the project in advance of items being submitted in order to provide a comprehensive list of expected or required submittals and documents.

The Architect then adds project team members, including contractor(s) and consultant(s), and defines which sections they are responsible for submitting or reviewing in step 108. If the team members added by the Architect are already registered users of the system, they receive an email notice that they have been added to the new project in step 110. If they are not already registered users, they receive an email notice inviting them to register in step 112. At this point the project is now available online for team members to view, add, or review submittals in step 114. The present invention contemplates that based on an email address of a new team member, the system can determine the company affiliation of the new team member and access privileges to assign to the new team member. This is accomplished by examining the domain portion of the email address. Thus, for example, where a domain name is already associated with an Architect, a team member having an email address which includes the same domain name may be assigned privileges consistent with other team members associated with the same domain. This feature provides additional convenience in adding project team members.

When a Contractor has a submittal to be reviewed by the Architect in step 116, the process then varies depending upon whether the submittal is available in electronic form or if it is only available in paper (hardcopy). If available electronically, the Contractor adds the submittal to the system under the appropriate specification section in step 118. The system records the date and submittal information in the submittal log, and saves a copy of the electronic file in step 120. If during the project setup the Architect had been designated as the primary reviewer of the designated submittal's section, then the system sends an email notice to the Architect notifying them of the new submittal in step 122. The Architect accesses the system submittal log, downloads a copy of the submittal, and reviews it in step 124. Comments and corrections to the submittal are placed within a copy of the submittal file, and the Architect then uploads the reviewed copy back onto the system in step 126. The system records the date, review action code, and any remarks from the Architect in the submittal log in step 128. An email is sent to the Contractor notifying them of the review results in step 130. The Contractor is able to access the system submittal log and download the reviewed copy of the submittal in step 132.

If a Consultant has instead been designated as the primary reviewer of the designated submittal's section, then the system instead sends an email notice to the Consultant notifying them of the new submittal in step 134. The Architect receives a copy of the notice to the Consultant in step 136, a feature which can be turned on or off on a project-by-project basis depending on the preference of the Architect. The Consultant accesses the system submittal log, downloads a copy of the submittal, and reviews it in step 138. Comments and corrections to the submittal are placed within a copy of the submittal file, and the Consultant then uploads the reviewed copy back onto the system in step 140. The system records the date, review action code, and any remarks from the Consultant in the submittal log in step 142. The system sends an email notice to the Architect notifying them that the Consultant has completed review of the submittal in step 144. The Architect then accesses the system submittal log and reviews the Consultant's remarks and action on the submittal in step 146. If the Architect has additional remarks of their own that need to be recorded for the submittal, they are added to the system submittal log in step 148. If no additional remarks or actions are necessary, the Architect simply releases the submittal to the Contractor in step 150. In either case, the system then sends an email notice to the Contractor notifying them of the review results in step 152. The Contractor is able to access the system submittal log and download the reviewed copy of the submittal in step 154.

If the submittal in question is only available in paper form, then as indicated previously the process varies. The Contractor mails or ships multiple paper copies of the submittal to the Architect in step 156. The Architect receives the submittal and records the date of receipt and other submittal information in the system submittal log in step 158. If the Architect is the primary reviewer of the designated submittal's section, then the system offers an option to print a routing slip to the track the submittal's status within the Architect's office in step 160. The Architect then reviews the paper copies of the submittal in step 162. Comments and corrections to the submittal are written directly on the paper copies of the item, and the Architect records the review results, action code, date completed, and any remarks in the system submittal log in step 164. The system offers an option to print a transmittal for use in sending the submittal copies back to the Contractor in step 166. The present invention provides the option of generating paper transmittals and/or review slips whenever there is an exchange of paper items, physical samples, or other physical items. The Architect mails or ships a certain number of the submittal copies back to the Contractor, but retains a limited number of copies for the Architect's or building owner's own records in step 168.

If a Consultant had instead been designated as the primary reviewer of the designated submittal's section, then the Architect prepares to send the paper copies of the submittal to the Consultant and records the date of the transfer in the system in step 170. The system offers an option to print a transmittal for use in sending the submittal copies to the Consultant in step 172. The Architect then mails or ships the submittal copies to the Consultant in step 174. The Consultant receives and reviews the submittal in step 176, and any comments or corrections to the submittal are written directly on the paper copies of the item. The Consultant then mails or ships the submittal copies back to the Architect in step 178. The Architect records the Consultant's review results, action code, date of receipt, and remarks in the system submittal log in step 180. If the Architect has additional remarks of their own that need to be recorded for the submittal, they are added to the paper copies of the submittal and to the system submittal log in step 182. The system offers an option to print a transmittal for use in sending the submittal copies back to the Contractor in step 184. The Architect mails or ships a certain number of the submittal copies back to the Contractor, but retains a limited number of copies for the Architect's or building owner's own records in step 186. The present invention provides the option of generating paper transmittals and/or review slips whenever there is an exchange of paper items, physical samples, or other physical items.

Figure 7:
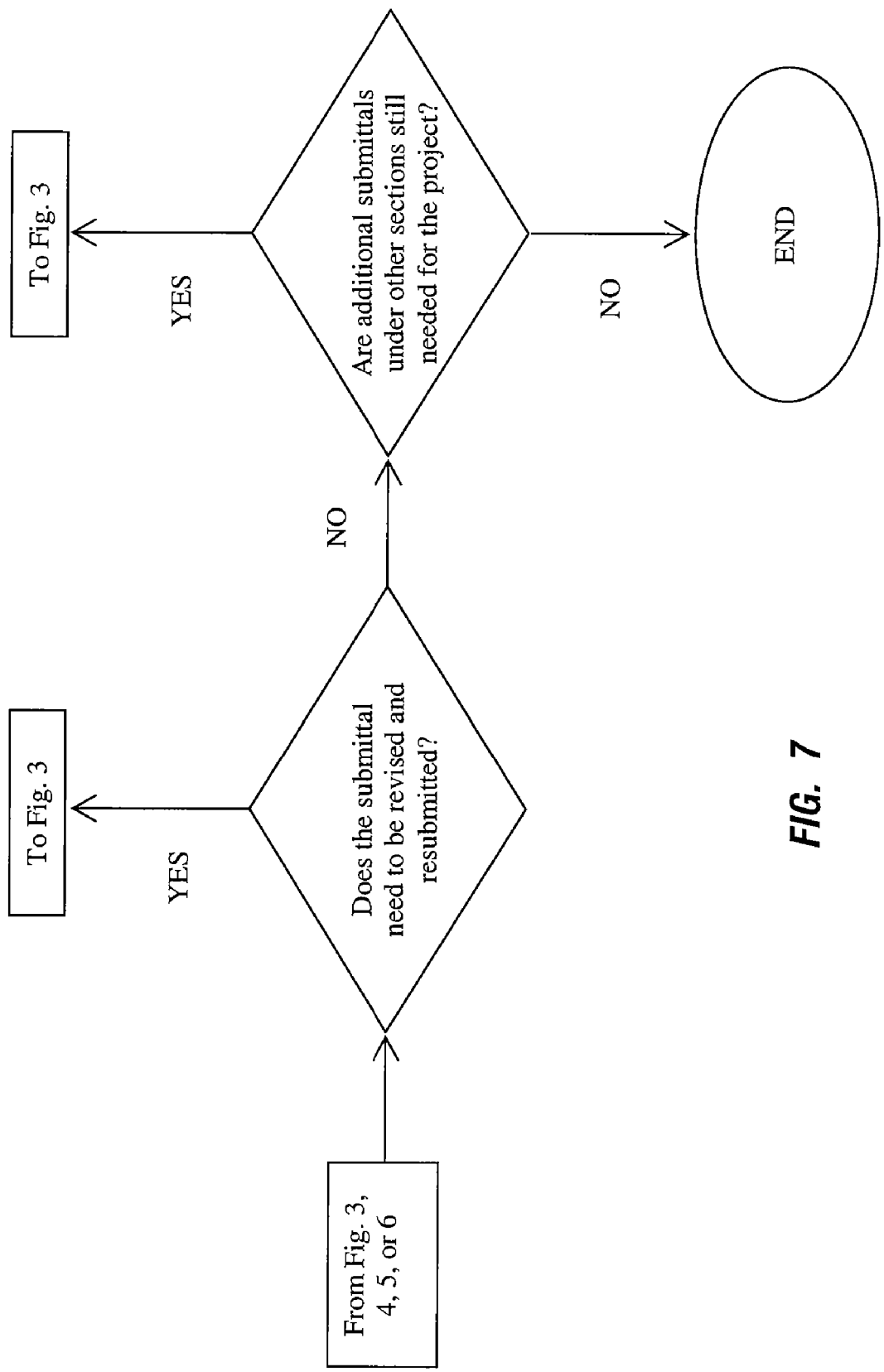

After completion of this process, the submittal may or may not need to be resubmitted depending on the review results by the Architect and/or Consultant. If the item needs to be resubmitted, the process is repeated. The process is likewise repeated for all other required submittals for the project, as illustrated in FIG. 7.

Figure 8:
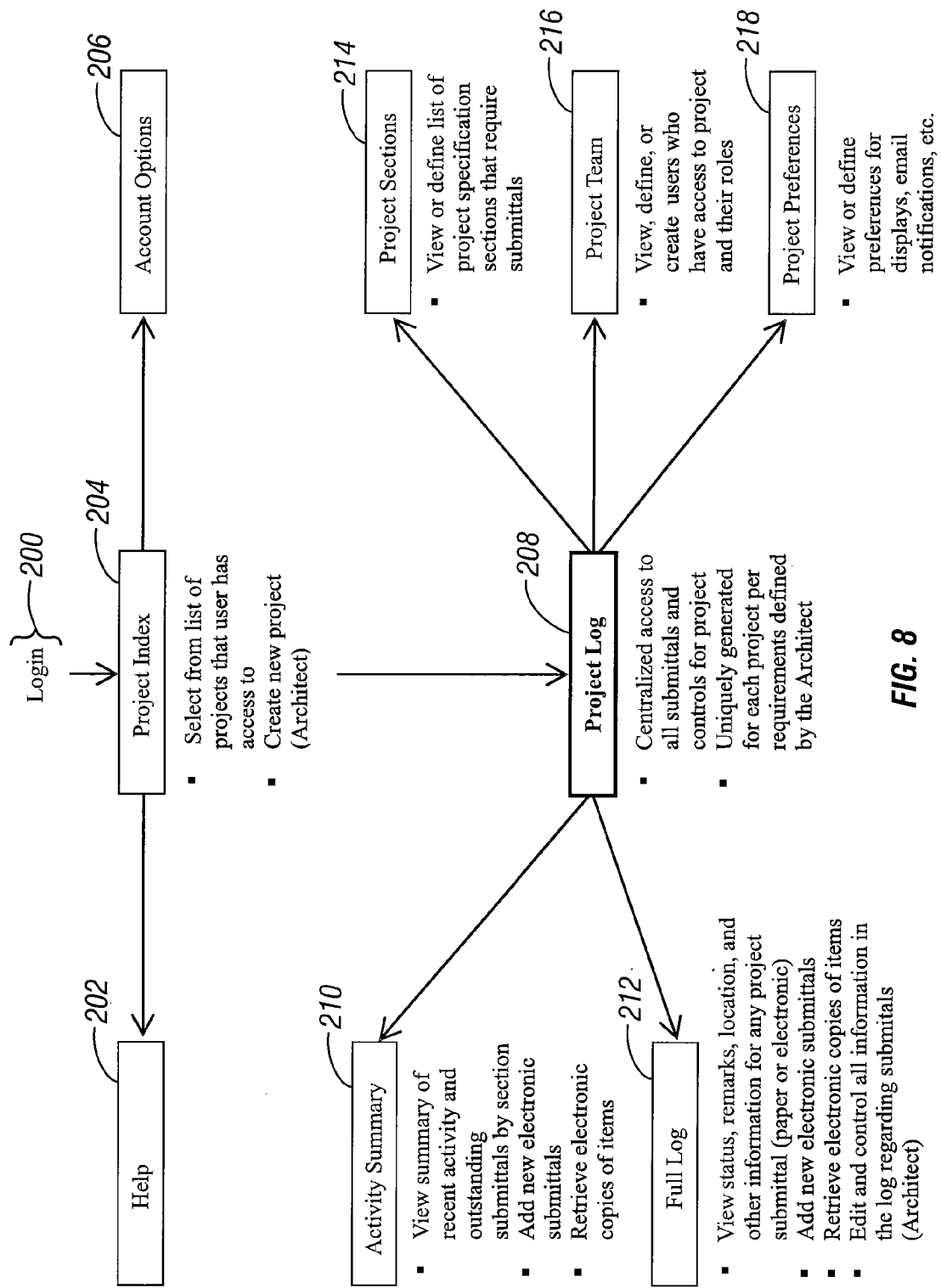
FIG. 8 is a diagram illustrating an overview of system structure according to one embodiment of the present invention.

FIG. 8 shows an overview of the major system components of the invention. In FIG. 8, a login 200 is provided such as may be accomplished by requesting username or email address and a password. Of course other forms of login may be used. Once logged into the system, a project index 204 is shown. The project index allows a user to select from a list of projects that the user has access to. The user also has the option of requesting help 202 information or account options 205. Once the user selects a project from the project index, the user is shown the project log 208. The project log 208 provides centralized access to all submittals and controls for a project. The project log is uniquely generated for each project per requirements defined by the Architect.

Associated with the project log 208 is an activity summary 210. The activity summary allows a user to view a summary of recent activity and outstanding submittals by section. The activity summary also allows new electronic submittals to be added and allows electronic copies of items to be retrieved.

The user may also view the full log 212. The full log 212 provides additional information about the project. This includes status, remarks, location, and other information associated with any project submittal, whether it is paper or electronic. The full log view also allows new electronic submittals to be added, electronic copies of items to be retrieved, and allows an architect to edit and control all information in the log regarding submittals.

The project sections view 214 allow one to view or define a list of project specification sections that require submittals. The project team view 216 allows an architect to view, define or create users or project team member profiles who have access to projects and the role of each member. The project preferences 218 allow one to view or define preferences for displays, email notifications, and other options.

Figure 9:
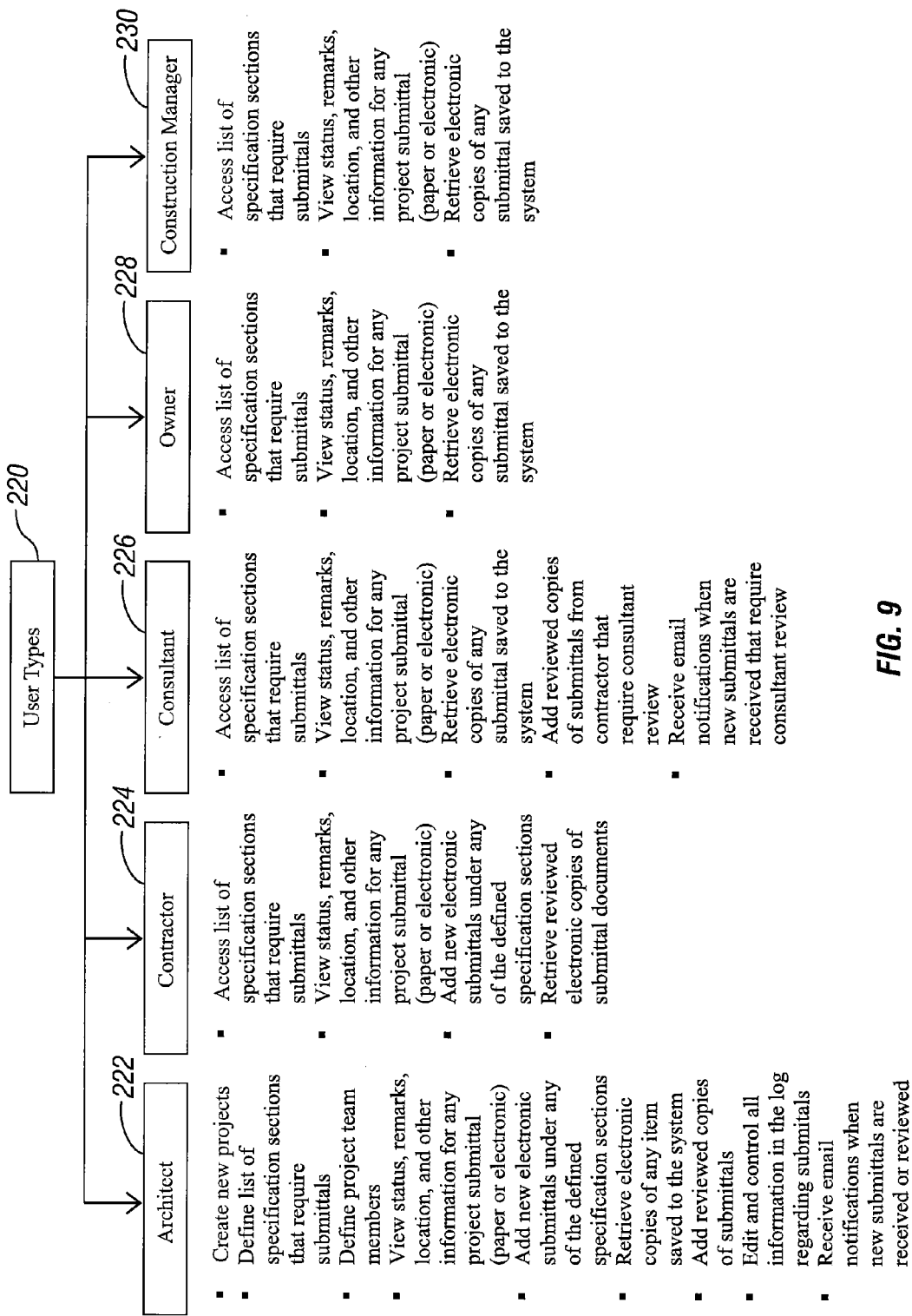
FIG. 9 is a diagram indicating different user types according to one embodiment of the present invention.

FIG. 9 illustrates the different types of users (Architect, Contractor, Consultant, Owner, Construction Manager) that the invention is designed for and the access/features that each category of user has available to them. The user types 220 includes an architect 222, contractor 224, consultant, 228, and construction manager 230. Features associated with an architect 222 include, without limitation, the ability to create new projects, the ability to define a list of specification sections that require submittals, the ability to define project team members, the ability to view status, remarks, location, and other information for any project submittal whether paper or electronic, the ability to add new electronic submittals under any of the defined specification sections, the ability to retrieve electronic copies of any item saved to the system, the ability to add reviewed copies of submittals, the ability to edit and control all information in the log regarding submittals, and the ability to receive email notifications when new submittals are received or reviewed.

Features associated with a contractor 224 include, without limitation, the ability to access a list of specification sections that require submittals, the ability to view status, remarks, location, and other information for any project submittal whether paper or electronic, the ability to add new electronic submittals under any of the defined specification sections, and the ability to retrieve reviewed electronic copies of submittal documents.

Features associated with a consultant 226 include, without limitation, the ability to access a list of specification sections that require submittals, the ability to view status, remarks, location, and other information for any project submittal whether paper or electronic, the ability to retrieve electronic copies of any submittal saved to the system, the ability to add reviewed copies of submittals from the contract that require consultant review, and the ability to receive email notifications when new submittals are received that require consultant review.

Features associated with an owner 228 include, without limitation, the ability to access a list of specification sections that require submittals, the ability to view status, remarks, location, and other information for any project submittal whether paper or electronic, and the ability to retrieve reviewed electronic copies of submittal documents.

Features associated with a construction manager 230, include, without limitation, the ability to access a list of specification sections that require submittals, the ability to view status, remarks, location, and other information for any project submittal whether paper or electronic, and the ability to retrieve reviewed electronic copies of submittal documents.

The present invention is not limited to the specific features described and contemplates that additional features may be included for various user types depending upon their role in a particular project. In addition, the present invention contemplates that additional user types or user sub types may be created where appropriate. From FIG. 9, it should be apparent that the application provides a first level of access to a contractor to submit construction submittals, a second level of access to an architect to review and manage construction submittals, a third level of access to consultants to review construction submittals, and a fourth level of access to facilities owners, construction managers, and other parties to monitor the submittal process.

FIG. 10 through FIG. 15 illustrate various embodiments of screen displays of the present invention. The screen displays are associated with an application executing on a computing device. The application is preferably as web-based application accessible to various users over the Internet. Note that the particular user interface shown provides for a number of tabs which are available for selection by a user. Using the tabs a user may easily switch views. The present invention, of course, contemplates that any number of layouts or user interfaces can be used to exchange information with a user. FIG. 10 is a screen display showing a project index according to one embodiment of the present invention. Note that the project index provides a list of different projects that may be selected.

FIG. 11 is a screen display illustrating an activity summary according to one embodiment of the present invention. As can be seen in FIG. 11, dates, actions may be recorded in a structured log format with the status of each item recorded in a linear, step-by-step manner. The structured log format include section number, section title, the ability to add items, a description of the most recent activity, the date, type, and action associated with the item.

Figure 12:
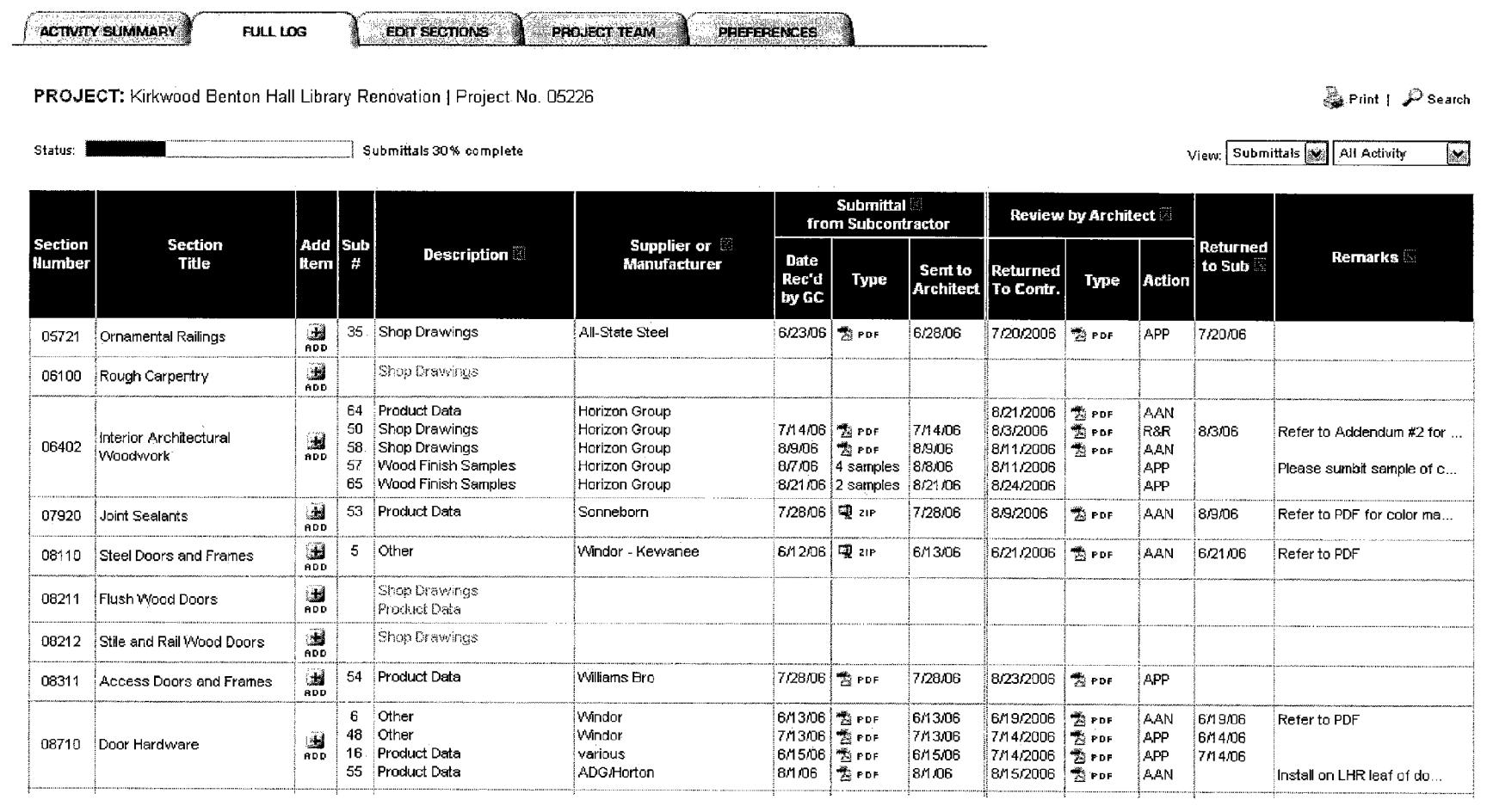

FIG. 12 is a screen display illustrating a full log according to one embodiment of the present invention. In FIG. 12, dates, actions, and pertinent remarks from reviewers may be recorded in a structured log format with the status of each item recorded in a linear, step-by-step manner. The submittal log may be organized by number according to a project specification section. The log may be further organized by individual submittal numbers assigned to each submittal item. Various user-controlled options for submittal item numbering may be used, including unique numbering over the entire project, numbering within each specification section, or variations thereof as required by the architect or contractor.

The user has the ability to record new submittals, transfer submittals to other parties, or record review results through a single multi-functional button per each specification section in the log. The full log includes rows and columns presented in a structured log format. For each row there is: a section number; a section title; the ability to add a document; a submittal number; a description; a supplier or manufacturer; a submittal by contractor, including the date received and type of submittal; a review by a consultant including the date sent to the consultant, the date received back from the consultant, the type of submittal, and action; a review by the architect, including the date returned to the contractor, the type of submittal, the action; and remarks. This format allows a complete record of submittal process associated with a project to be displayed and understood so that at any time one can determine the progress made.

Note that there is a single multi-functional button for each specification section entry in the log which allows to record new submittals, transfer submittals to other parties, or record review results. A user may select this button to perform any of those actions.

Note also the action codes shown for the consultant and the architect. The present invention allows the consultant and the architect to setup or use their own review or action codes based on their preferences, standards associated with their organization, or the advice of legal counsel in order to address professional liability concerns related to the submittal review process.

FIG. 13 is a screen display illustrating an edit sections feature according to one embodiment of the present invention. Thus, a user may select a section to edit or delete or may add a new section. Note there is a number associated with each section. The number is preferably from the project specification.

FIG. 14 is a screen display illustrating a project team feature according to one embodiment of the present invention. The screen display shows team members who are on a project and indicates whether they are associated with an architect/engineer, a contractor, a consultant, or other user type. The permissions associated with each team member are also displayed such as "Read Only" or "Review" or "Submit." Each team member is assigned a range of project specification sections or individual section numbers which then govern to whom automatic electronic mail notices of new or reviewed submittals are distributed. New team members may be added. Where new team members are added, the email address of the team member can be used to automatically determine the type of user where the email address shares a domain with a pre-existing team member.

FIG. 15 is a screen display illustrating a preferences feature according to one embodiment of the present invention. The preferences include a project name and project number. In addition, email notification preferences are shown. This allows various options associated with email notifications to be set. These include sending email notifications each time a new submittal is uploaded or reviewed, who to send copies of email notifications. Such email notification may be sent to the appropriate team members based on the specification section range associated with each team member. Other email notification options can include sending email notifications at pre-set intervals. For example, automated email reminders of outstanding items waiting for submittal or review may be sent at intervals specified by the user.

The present invention allows an architect to organize, monitor and control the review process in various ways. For example, the architect may prevent the contractor from receiving or viewing results of consultant reviews until the architect has also reviewed or released the item. By way of another example, the architect has control over the content of the submittal log but may prevent contractors, consultants, or other users from modifying the log content without the consent of the architect. In still another example, the architect may record in the submittal log the submittal requirements and expected items for the project in advance of items being submitted, in order to communicate to the contractor and other users a comprehensive list of required submittals and documents.

One skilled in the art having the benefit of this disclosure will appreciate that the present invention provides for tracking and displaying submittals and the progress of a project. Because such information is tracked and maintained, various reports may be made on the progress of a project. For example, a graphic status bar may be displayed indicating the percentage of expected project submittals or other documents that have been exchanged through the system to date, or this same information may be presented numerically or through alternative graphical illustration. In another example, the submittal log may be filtered or sorted based on review results, items pending review, submittals still needed, or other criteria.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A system for facilitating exchange and review of electronically submitted construction submittals and management and review of all construction submittals associated with a construction project, the system comprising:

a computing device accessible via an online computer network, the computing device adapted to provide a first level of access to a contractor to submit the construction submittals to the computing device via the online computer network, a second level of access to an architect to review and manage the construction submittals via the online computer network, a third level of access to at least one consultant to review the construction submittals via the online computer network, and a fourth level of access for monitoring the submittal process via the online computer network;

wherein the computing device is adapted to cause a display screen to display status information, review dates, quantities, links to electronic files, actions, and remarks for all project submittals in a submittal log arranged in a column and row format;

wherein the computing device is adapted to organize the submittal log based on project specification section, wherein each specification section in the submittal log includes a button, whereby selection of the button prompts a user to enter information necessary to record new submittals, transfer submittals to other parties, and record review results;

wherein the computing device is adapted to cause the display screen to display a plurality of tabs to control view of additional screen displays, the additional screen displays including a preferences screen display to set access levels and notifications preferences, a project team screen display to display and edit team members, an edit sections screen display to create and select project specifications to include in the submittal log, and an activity summary screen display to display the latest activity for each project specification in the submittal log; and wherein one of the columns of the submittal log lists a plurality of submittal section titles, each of the section titles corresponding to a separate row, each of the rows including the button, at least one submittal item listing, the submittal item listing including status information, a link to an electronic file, and remarks.

2. The system of claim 1 wherein the application further comprises means to organize the submittal log by numbering based on project specification section.

3. The system of claim 2 wherein the computing device further comprises means to further organize the submittal log by numbering based on submittal item numbering.

4. The system of claim 1 wherein the computing device further comprises means for multiple, user-controlled options for submittal item numbering, including unique numbering over the entire project and numbering within each specification section.

5. The system of claim 4 wherein the computing device further comprises means to automatically send electronic mail notices of new submittals and reviewed submittals to team members of a project team based on specification section range entered for each team member on the project team.

6. The system of claim 5 wherein the computing device further comprises means to allow the architect control over the review process and the ability to prevent the contractor from receiving or viewing results of consultant reviews until the architect has also reviewed or released the item.

7. The system of claim 6 wherein the computing device further comprises means for the architect to setup review codes and action codes based on preference, standards associated with an organization associated with the architect, and advice of counsel.

8. The system of claim 7 wherein the computing device further comprises means for the consultant to setup review codes and action codes based on preference, standards associated with an organization associated with the consultant, and advice of counsel.

9. The system of claim 8 wherein the computing device further comprises means to record in the submittal log submittal requirements and expected items for the project in advance of items being submitted, in order to provide a comprehensive list of required submittals and documents.

10. The system of claim 9 wherein the computing device further comprises means to switch views between different documents types.

11. The system of claim 10 wherein the different document types include submittals and closeout documents.

12. The system of claim 11 wherein the computing device further comprises means to recognize company affiliation of a new user based on a domain portion of an email address associated with the new user and to assign project access privileges based on the company affiliation.

13. The system of claim 12 wherein the computing device further comprises means to send automatic electronic mail reminders of outstanding items waiting for submittal or review at intervals specified by the user.

14. The system of claim 13 wherein the computing device further comprises means to display a graphic status bar indicating a percentage of expected project submittals or other documents that have been exchanged through the system to date.

15. The system of claim 14 wherein the computing device further comprises means to generate paper transmittals and review slips when required by the user for exchange of physical items;

16. The system of claim 15 wherein the physical items are selected from a set consisting of paper items and physical samples.

17. A method for facilitating exchange and review of electronically submitted construction submittals and management and review of all construction submittals associated with a construction project, the method comprising:

providing access to a computing device via an online computer network;

the computing device being adapted to provide a first level of access to a contractor to submit construction submittals, a second level of access to an architect to review and manage construction submittals, a third level of access to at least one consultant to review construction submittals, and a fourth level of access for monitoring the submittal process;

the computing device being adapted to cause a display screen to display the status, review dates, quantities, links to electronic files, actions, and remarks associated with project submittals in a submittal log organized in a column and row format based on project specification sections, wherein one of the columns of the submittal log lists a plurality of submittal section titles, each of the section titles corresponding to a separate row, each of the rows including at least one submittal item listing, the submittal item listings including status information, a link to an electronic file, and remarks, wherein each specification section in the submittal log includes a button, whereby selection of the button prompts a user to enter information necessary to record new submittals, transfer submittals to other parties, and record review results; and the computing device being adapted to cause the display screen to display a plurality of tabs to control view of additional screen displays, the additional screen displays including a preferences screen display to set access levels and notifications preferences, a project team screen display to display and edit team members, an edit sections screen display to create and select project specifications to include in the submittal log, and an activity summary screen display to display the latest activity for each project specification in the submittal log.

18. The method of claim 17 wherein the computing device further comprises means to organize the submittal log by numbering based on project specification section numbering.

19. The method of claim 18 wherein the computing device further comprises means to further organize the submittal log by numbering based on submittal item numbering.

20. The method of claim 17 wherein the computing device further comprises means for multiple, user-controlled options for submittal item numbering, including unique numbering over the entire project and numbering within each specification section.

21. The method of claim 20 wherein the computing device further comprises means to automatically send electronic mail notices of new or reviewed submittals to team members based on specification sections associated with each team member.

22. The method of claim 21 wherein the computing device further comprises means to allow the architect control over the review process and to prevent the contractor from receiving or viewing results of a consultant review of an item until the architect has also reviewed or released the item.

23. The method of claim 22 wherein the computing device further comprises means to allow the architect or the consultant to setup a review or action code.

24. The method of claim 23 wherein the computing device further comprises means to record in the submittal log submittal requirements and expected items for the project in advance of items being submitted, in order to provide a comprehensive list of required submittals and documents.

25. The method of claim 24 wherein the computing device further comprises means to switch views between different documents types including submittals and closeout documents.

26. The method of claim 25 wherein the computing device further comprises means to recognize a company affiliation of a new user based on a domain portion of an email associated with the new user and to assign project access privileges based on the company affiliation.

27. The method of claim 26 wherein the computing device further comprises means to send automatic electronic mail reminders of outstanding items waiting for submittal or review at intervals specified by the user.

28. The method of claim 27 wherein the computing device further comprises means to display a graphic status bar indicating a percentage of expected project submittals or other documents that have been exchanged through the system to date.

29. The method of claim 28 wherein the computing device further comprises means to generate paper transmittals and review slips when required by the user for exchange of physical items.

* * * * *